Patented Dec. 20, 1949

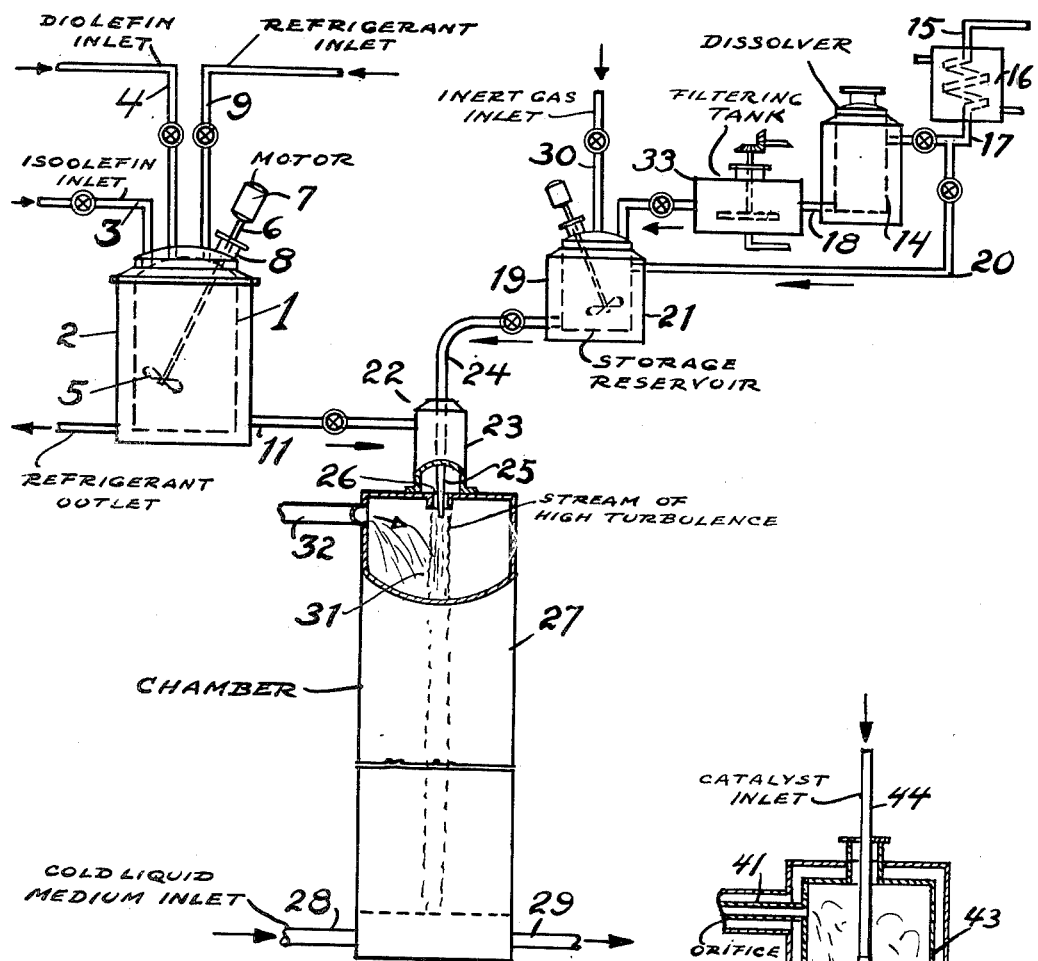

2,491,710

UNITED STATES PATENT OFFICE 2,491,710

NOZZLE PROCESS FOR MAKING BUTYL RUBBER

John D. Calfee, Westfield, Robert M. Thomas, Union, and Paul J. Flory, Cranford, N. J., assignors to Standard Oil Development Company, a corporation of Delaware Application June 16, 1943, Serial No. 491,028

8 Claims. (Cl. 260—85.3)

This invention relates to the low temperature polymerization of olefinic material, relates particularly to continuous processes for olefinic polymerization; and relates especially to a jet and nozzle system for mixing the olefinic material and the polymerization catalyst.

It has been found possible to polymerize olefinic material such as the isoolefins, especially isobutylene, either alone or in admixture with a polyolefin such as butadiene, isoprene, piperylene and the like, at temperatures ranging from about 0° C. to —40° C. down to —127° C. or lower to —164° C.; to yield a high molecular weight rubbery polymer which when prepared from mixed isoolefin and diolefin is reactive with sulfur and other curing agents in a curing reaction to yield a material having a good tensile strength ranging from 1000 to 4600 pounds per square inch and an elongation at break ranging from 300% or 400% to 1200%. This reaction uses a Friedel-Crafts type catalyst, preferably in solution in a low-freezing, non-complex forming solvent; aluminum chloride dissolved in ethyl or methyl chloride or carbon disulfide being particularly useful. The reaction has previously been conducted by batch methods and it is difficult to work, because of the fact that the polymer is obtained as particles which tend to coagulate into a solid mass which is difficult to remove from a reactor, difficult to purify and difficult to handle. Also, the products formed must be removed periodically from the reactor, which is only possible by interrupting the polymerization operation.

The present invention provides a simple, continuous process for the polymerization reaction by which a stream of cold olefinic material is combined with a small jet of catalyst solution through a nozzle submerged in the olefinic material stream. The reaction then takes place in a turbulently flowing stream of mixed olefinic material and catalyst solution and approaches completion after a relatively few feet of travel.

The stream of polymer and incidental material is then collected in any convenient way such as by delivery into a liquid pool in which the liquid may be warm soda solution or may be warm alcohol (either ethyl, methyl, propyl, butyl or other alcohol) or may be warm naphtha containing a very small percentage, less than 2 or 3% of alcohol; or the like. Alternatively, the stream may be delivered against an unrefrigerated metal surface, stationary or moving, upon which the solid polymer collects and the liquid portion flows away; the solid polymer being collected by scraping it off or by movement of the surface. Alternatively, the polymer may be collected in a pool of well stirred hot water. With any of these arrangements, the polymer is separated from residual quantities of material such as unpolymerized olefins, catalyst solvent, diluent or refrigerant and brought up to room temperature for subsequent processing.

Thus, the apparatus of the invention consists of means for the production of a cold supply of polymerizable olefinic material and a cold supply of catalyst solution with means for mixing the olefins and catalyst in a turbulent jet, to initiate the polymerization reaction under conditions of turbulent flow for rapid admixture of catalyst and olefin material and prompt initiation of the polymerization reaction, and to conduct substantially all of the polymerization in the flowing, unsupported stream of olefinic material; thereafter collecting the stream of solid polymer with residual olefin and catalyst solvent for subsequent processing. Other objects and details of the invention will be apparent from the following description, when read in connection with the accompanying drawing, wherein Figure 1 is a diagrammatic view in vertical elevation of the device of the invention; and Figure 2 is a similar view of an alternative embodiment.

In practicing the invention, there is first prepared a polymerizable material which is broadly a cold isoolefin. For this purpose isobutylene is the preferred material, but other olefins such as 2-methyl butene-1 or 3-methyl butene-1 may be used. The isoolefin may be polymerized alone into a simple polyisoolefin such as polyisobutylene or polybutene. Preferably, however, the mixture contains also a polyolefin containing from 4 to 12 or 14 carbon atoms per molecule such as butadiene or isoprene or piperylene or dimethyl butadiene or dimethallyl or myrcene or the like. This mixture is cooled to temperatures ranging from —10° C. for the isobutylene alone and from —40° C. for the isoolefin-diolefin mixture down to temperatures as low as —78° C. or —103° C. or —127° C. or even as low as —164° C. depending upon the character of the olefinic material and the molecular weight desired in the finished polymer and the nature of the catalyst to be used. The cooling may be obtained by a refrigerating jacket upon a storage container or by circulating the olefinic material through a cooling coil submerged in refrigerant. Alternatively, an internal refrigerant may be used such as liquid propane, solid carbon dioxide, liquid ethane, liquid ethylene or even liquid methane or mixtures of the various hydrocarbons according to the temperature desired.

The catalyst solution may be prepared from substantially any of the Friedel-Crafts type catalysts, as disclosed by N. O. Calloway in his article on "The Friedel-Crafts synthesis" printed in the issue of "Chemical Reviews" published for the American Chemical Society at Baltimore in 1935 in volume XVII, No. 3, the article beginning on page 327, the list being particularly well shown on page 375, may be used. The preferred catalyst, however, is aluminum chloride. For the solvent, substantially any low-freezing, non-complex forming substance having a freezing point below about —10° C. to —40° C. may be used. The preferred solvents are ethyl or methyl chloride or carbon disulfide, but substantially any of the mono or polyalkyl halides may be used, provided their freezing points are below the values indicated.

Referring to Figure 1, the olefinic material mixture may be prepared in a tank member 1 which may be surrounded by a refrigerating jacket 2 as shown. The isoolefin, preferably isobutylene, may be delivered through a pipe 3 from any convenient source. When isobutylene is used, it is preferably obtained in a purity at least as great as 85% and preferably the purity is raised to 95% or 96%. When a diolefin is used it likewise may be delivered through a supply pipe 4 to the container 1. A propeller member 5 is provided mounted upon a shaft 6 driven by a motor 7, the shaft 6 being preferably passed through a gas type stuffing box 8, the storage tank 1 being preferably tightly closed by a cover as shown. In the event that an internal refrigerant is used, it is conveniently added through a supply pipe 9, if liquid hydrocarbons are used or charged through a hand hole (not shown) if solid carbon dioxide is used. The cold olefinic material is discharged from the container 1 through a conveyor pipe 11.

The catalyst solution is prepared by charging solid aluminum chloride into a container member 14 which also is preferably surrounded with a refrigerating jacket. A supply of liquid catalyst solvent is delivered through a pipe member 15 to a cooling coil and refrigerant jacket device 16 and thence through a transfer pipe 17 to the container 14. The catalyst solvent is allowed to pass slowly through the aluminum chloride in the container 14 and is withdrawn through a pipe 18, preferably to a refrigerated storage tank 19 having a refrigerated jacket 21.

The container 14 may be provided with a stirrer (not shown) if desired, to expedite the preparation of the catalyst solution; or it may be provided with a circulating pump taking liquid from the bottom portion and returning it to the top to provide a circulation through the solid Friedel-Crafts halide. Also there is desirably provided a settling chamber or filter between the dissolver 14 and the receptacle 21 to prevent the passage of solid particles of undissolved catalyst material, as shown.

There is then provided a jet structure 22 which conveniently takes the form of a T member 23 forming a chamber to which the delivery pipe 11 from the tank 1 is connected. At the upper end of the member 23 there is inserted a lead pipe 24 connected to the catalyst storage reservoir 19. The member 23 is terminated at the bottom in an outlet which, as is shown in Figure 1, consists merely of an orifice. The pipe member 24 is then extended downward in the form of a fine needle jet 25 into and through the bottom orifice 26 in the member 23. The member 23 conveniently is positioned at the top of a good-sized chamber 27 which may be from 2 to 10 or 20 feet or more high, the orifice member 26 being located within the chamber 27, the member 23 being preferably attached with a vapor tight joint. At the bottom of the member 27 there is provided one or another of several collecting means.

At the bottom of the chamber 27 there may be provided a flowing stream of cold liquid medium such as ethylene or other material entering through a supply pipe 28, leaving through a supply pipe 29, a small pool of liquid being maintained in the bottom of the member 27, the solid polymer being swept out through the discharge outlet 29 with the flowing stream of liquid.

In the operation of this embodiment of the invention the olefinic material, which may preferably consist of a major proportion of isobutylene with a minor proportion of a diolefin, the preferred proportions being from 70 to 99.5 parts of the isoolefin with 30 to 0.5 parts of the polyolefin, is prepared in the container 1 and cooled to the desired low temperature. Simultaneously, the cold catalyst solvent, preferably methyl chloride, is allowed to flow over the Friedel-Crafts catalyst, preferably aluminum chloride, in the dissolver 14 into the storage reservoir 19 where it may, if desired, be diluted to any desired concentration with additional cold solvent through a transfer pipe 20. A valve in the pipe 11 is then opened to deliver the cold olefinic material to the member 23, and when a good stream of olefinic material is discharged through the orifice 26, a valve in the line 24 is opened to deliver a stream of catalyst through the jet member 25. The catalyst solution is preferably delivered under comparatively high pressure which may be provided by closing a valve in the pipe 18 and delivering an inert gas under pressure through a delivery pipe 30. The olefinic material from the container 1 is preferably delivered under a low pressure such as from ½ to 1 pound per square inch which is readily obtained merely by hydrostatic pressure. The pressure upon the catalyst solution in the container 19 may range from 10 to 500 pounds according to the rate of delivery desired and the amount of turbulence desired.

By this procedure the stream of olefinic material is delivered under conditions of relatively high turbulence within the chamber 27, and the turbulence is increased by the presence of the jet of catalyst solution from the pipe 25. This turbulence is sufficient to give an excellent mixing effect between the two streams. If the distance of travel from the jet to the collecting means is small, such as one or two feet or less, the jet may be in turbulent flow during the whole of its travel. However the turbulence disappears relatively rapidly from the stream since turbulence ceases in any free flowing stream after the jet velocity and the stream velocity have equalized. But the relatively few inches of turbulent flow are sufficient to obtain a very thorough and fully adequate mixing of catalyst and olefinic material. After a short distance of travel, the effect of jet turbulence disappears but tends to be replaced by convection currents resulting from the heat of reaction and other aspects of the reaction which maintain a good mixing of the stream until a major portion is converted into solids and the stream containing the solids is collected at the end of the time of travel.

The polymerization reaction begins within a very few inches or even a fraction of an inch of the end of the catalyst jet, and there results a stream which starts as a liquid and is converted during its travel in free space into a predominantly solid body which is collected and broken up into relatively small particles by the liquid in the pool at the bottom of the member 27 and carried out through the discharge pipe 29.

From the pipe member 29 the slurry of polymer in liquid is conveyed to a collector in the form of a convenient strainer or filter or sieve which separates the solid polymer from the liquid material. If liquid ethylene is used, the separated solid polymer is brought up to room temperature in any convenient manner and then washed and purified as desired. If warm alcohol is used for the liquid pool in the bottom of the member 27, the polymer forms as a slurry with the volatile components of the reaction mixture volatilized in the member 27 and recycled after discharge through a pipe member 32. The slurry of polymer in alcohol is conveniently strained out, washed with additional quantities of alcohol to remove the hydrocarbon oil, and then, if desired, washed with water to remove the last traces of alcohol and catalyst decomposition products. Thereafter the polymer may be processed on the open roll mill for further purification and compounding in the usual manner.

The jet member 23 as shown in Figure 1 utilizes a short jet tube with the catalyst nozzle protruded entirely through the orifice. This, however, is not necessary, and the alternative embodiment of Fig. 2 may be utilized. In this embodiment a relatively long outlet orifice is provided with the catalyst discharge nozzle just entering the jet. As in Example 1, the catalyst is supplied through a tube 44 to the jet 45 positioned within the container 43, which is filled with the desired olefinic feed material through a pipe 41. The olefinic material is mixed with the catalyst in a prolonged orifice member 46 from which it is discharged in the form of a turbulent stream 47 as shown. The outlet orifice member 46 may take the form of a tubular structure having the same diameter throughout as shown. Alternatively, however, a preferred manner of construction is to arrange the jet member 46 in the form of a "Venturi" structure to modify the speed of delivery of the polymerization mixture and to prevent the building up of solid polymer on the end of the orifice and thereby avoid the danger of clogging which is otherwise present.

Both of these embodiments are shown as delivering the jet in a downward direction. This, however, is not at all necessary, and instead the jet may be directed at an angle to the vertical or, if desired, may even be directed horizontally, or even at an angle above the horizontal. These angles are in some instances preferable, since they give a longer time for reaction without requiring a high or long chamber for the stream.

Also more than one jet may be utilized with a single reaction chamber and collector, thereby greatly increasing the capacity of the apparatus.

A series of examples were conducted using different types of olefinic feed mixtures; and a considerable range of distances between the nozzle and the collecting pool and a considerable variety of collecting means. These examples show that the percent conversion is very greatly influenced by the distance of travel of the stream, but that the molecular weight of the resulting polymer is but little influenced by the reaction time or distance of travel. These results are summarized in the following tables:

Table I shows the polymerization of isobutylene without other polymerizable material, but diluted with diluent or diluent refrigerant.

TABLE I

*Summary of data on the preparation of polybutene using parallel stream type nozzle*

| Run No. | Feed | Catalyst | Method of Collecting Product | Per Cent Conv. | Mol. Wt. | Williams Plasticity at 80° C. |
|---|---|---|---|---|---|---|
| 1354 | 30% isobutylene-70% methyl chloride. | 0.2 AlCl₃-MeCl | Alcohol at 36-inch distance. | 50 | 162,000 | |
| 1421 | ——do—— | 0.1 AlCl₃-MeCl | Hot water at 36-inch distance. | 37 | 153,000 | |
| 1422 | ——do—— | ——do—— | ——do—— | 51 | 137,000 | |
| 1723 | 33% isobutylene-67% ethane | 0.2 AlCl-MeCl | Metal surface at 48-inch distance. | 70 | 128,000 | 297-99 |
| 1698 | ——do—— | 1.0 BF₃-MeCl | ——do—— | 60 | 114,000 | 227-79 |
| 1724 | ——do—— | 0.2 AlCl₃-EtCl-ethane | Hot water at 24-inch distance. | 50 | 144,000 | 269-82 |

These results show the excellent polymerization of isobutylene to polyisobutylene of very high molecular weight.

The following Table II shows the preparation of mixed polymers of isobutylene with isoprene. This table is to a large extent self-explanatory. In the column headed "Description," the percentage values given are the percent of polymerizable hydrocarbon in the mixture which was prepared by dilution with methyl chloride; that is, run #1348 shows the use of a mixture containing 67% of methyl chloride with 33% of mixed olefins consisting of 14 parts per thousand of isoprene of a purity of 66%. The column headed "Method of product collection" shows the character of material in the pool in the quenching chamber 27 and also the distance from the nozzle to the collecting pool. The column headed "per cent conversion" shows the percentage of polymerizable material actually polymerized. The next column shows the molecular weight of the material. The next succeeding column shows the molecular percent unsaturation.

The polymer as collected was compounded on the mill according to the following recipe:

|  | Parts |
|---|---|
| Polymer | 100 |
| Carbon black | 10 |
| Zinc oxide | 5 |
| Stearic acid | 5 |
| Sulfur | 3 |
| TUADS (tetra methyl thiuram disulfide) | 1 |

After compounding the material was cured for various times and temperatures, as shown in the table, and the tensile strength then determined.

As shown in the column headed "Parts of Cabot #9," 10 parts of Cabot #9 carbon black were used in the compounding recipe in all but three of the evaluations and the tensile strengths and elongations at break of the resulting cured polymer are shown in the last six columns.

It may be noted that approximately 1000 ccs. per minute of diluted olefinic mixture were delivered through the nozzle 26, and approximately 100 ccs. of catalyst per minute were delivered through the tube 25.

comprising the steps of cooling isobutylene to a temperature within the range between −40° C. and −164° C., delivering a stream of the cold olefinic mixture in a downwardly facing direction, simultaneously delivering a concentric stream of a Friedel-Crafts type catalyst in liquid solution, both under a pressure within the range between 10 and 500 lbs. per square inch, sufficient to produce a condition of high turbulence in the falling stream for mixing the catalyst solution and cold olefinic material to fall freely

TABLE II

*Summary of data on the preparation of B-1.4 stocks using parallel stream type nozzle*

| Run No. | Description | Method of Product Collection | Per Cent Conv. | Mol. Wt. | Mol. Per Cent Unsat. | Parts of Cabot #9 | Evaluation of Vulcanized Stocks | | | | | |
|---|---|---|---|---|---|---|---|---|---|---|---|---|
| | | | | | | | 20' at 307° F. | | 40' at 307° F. | | 60' at 307° F. | |
| | | | | | | | T. S. | Per Cent Elong. | T. S. | Per Cent Elong. | T. S. | Per Cent Elong. |
| 1348 | B-1.4-66 feed (33%) 0.2 AlCl₃-MeCl catalyst. | Alcohol at 3-inch distance. | 22 | 69,000 | 0.68 | | | | | | | |
| 1349 | ----do---- | Alcohol at 9-inch distance. | 40 | 59,000 | 0.75 | 10 | 2,850 | 1,040 | 2,850 | 970 | | |
| 1350 | ----do---- | Alcohol at 21-inch distance. | 52 | 63,000 | 0.80 | | | | | | | |
| 1351 | ----do---- | Alcohol at 45-inch distance. | 58 | 55,000 | 0.81 | | | | | | | |
| 1413 | B-1.4-81 feed (33%) 0.2 AlCl₃-MeCl catalyst. | Alcohol at 36-inch distance. | 79 | 63,000 | | 10 | 1,500 | 1,025 | 2,400 | 1,025 | | |
| 1414 | ----do---- | ----do---- | 65 | 70,000 | | 10 | 2,400 | 1,025 | 3,150 | 1,025 | | |
| 1466 | B-1.4-81 feed (25%) 0.3 AlCl₃-MeCl catalyst. | ----do---- | 76 | 47,000 | | 10 | 2,050 | 995 | 2,650 | 940 | 2,900 | 910 |
| 1465 | B-1.4-81 feed (25%) 0.2 AlCl₃-MeCl catalyst. | ----do---- | 58 | 67,000 | | 10 | 2,500 | 960 | 3,100 | 935 | 3,150 | 885 |
| 1467 | ----do---- | ----do---- | 57 | 56,000 | | 10 | 2,600 | 915 | 3,250 | 885 | 3,250 | 875 |
| 1468 | Same as run 1466, but product "solution quenched" | Naptha-alcohol at 36-inch distance. | 13 | 53,000 | | 10 | | | 2,450 | 875 | | |
| 1464 | Same as run 1466, but usual alcohol quench. | Alcohol at 36-inch distance. | 63 | 48,000 | | 10 | 2,250 | 960 | 3,100 | 950 | | |
| 1488 | B-1.4-81 feed (25%) 0.15 AlCl₃-MeCl catalyst. | Liquid ethylene at 36-inch distance. | 60 | | | 10 | 3,100 | 950 | 3,250 | 850 | | |
| 1489 | Same as run 1488 | ----do---- | 40 | | | 10 | 2,750 | 925 | 3,400 | 900 | | |
| 1491 | ----do---- | ----do---- | 45 | | | 10 | 2,750 | 935 | 3,300 | 890 | 3,400 | 855 |
| 1493 | Same as run 1491 but product collected in alcohol. | Alcohol at 36-inch distance. | 30 | | | 10 | 3,100 | 925 | 2,650 | 800 | 3,450 | 810 |
| 1601 | B-1.45-93 feed (25%) 0.2 AlCl₃MeCl catalyst. | Dry metal sheet at 84-inch distance. | 60 | | | 60 | 1,950 | 900 | 2,550 | 860 | 2,650 | 860 |
| 1632 | Same as run 1601 | ----do---- | 70 | | | 60 | 2,400 | 860 | 2,400 | 820 | 2,500 | 760 |
| 1612 | Same as run 1601, but using liquid ethane diluent. | ----do---- | 55 | | | 60 | 1,650 | 960 | 2,000 | 860 | 2,150 | 850 |
| 1612 | "10-part black" evaluation of run 1612. | | | | | 10 | 1,600 | 950 | 2,300 | 920 | | |
| 1428 | B-1.4-81 feed (25%) 0.2 AlCl₃-MeCl catalyst. | Hot water at 36-inch distance. | 50 | 50,000 | | 10 | 1,375 | 1,075 | 2,100 | 945 | 2,375 | 915 |

These results show the excellent quality of the polymer obtained by the process and apparatus of the invention.

By the device of the invention, there is thus provided a polymerizing device and polymerization procedure by which the polymerization occurs during the travel of a stream of polymerization material downward in free space. By this procedure, all question of contact of metal surfaces with the polymerization mixture during the polymerization reaction is avoided, and all possibility of the building up of adherent masses of solid polymer to clog the apparatus is likewise avoided.

While there are above disclosed but a limited number of embodiments of the process and apparatus of the present invention, it is possible to provide still other embodiments without departing from the inventive concept herein disclosed and it is therefore desired that only such limitations be imposed upon the appended claims as are stated therein or required by the prior art.

The invention claimed is:

1. A low temperature polymerization process through space for a sufficient time and distance to obtain a desired amount of polymerization.

2. A low temperature continuous polymerization process comprising the steps of preparing a mixture of isobutylene in the ratio of 99½ to 70 parts with a multiolefin having from 4 to 14 carbon atoms in the ratio of from ½ part to 30 parts at a temperature within the range between −40° C. and −164° C., forming therefrom a free-falling stream of cold mixture under a pressure within the range between 10 and 500 lbs. per square inch, simultaneously preparing a Friedel-Crafts active metal halide catalyst solution, delivering the catalyst solution in a concentric jet within the free-falling stream of cold isobutylene-multiolefin mixture under a substantial pump pressure within the range between 10 and 500 lbs. per square inch sufficient to produce turbulent mixing of the catalyst solution into the isobutylene-multiolefin material, thereby causing the polymerization action to begin within the time in which a few inches of free fall occurs under the acceleration of gravity, allowing the stream to fall freely in space for a distance of at least two feet, and collecting the formed polymer and any unpolymerized material at the end of the free fall.

3. A low temperature polymerization process comprising the steps of mixing together a major proportion of isobutylene with a minor proportion of butadiene, cooling the mixture to a temperature within the range between −40° C. and −164° C., delivering a stream of the cold olefinic mixture in a downwardly facing direction, simultaneously delivering a concentric stream of a Friedel-Crafts-type catalyst in liquid solution, both under a pressure within the range between 10 and 500 lbs. per square inch sufficient to produce a condition of high turbulence in the falling stream for mixing the catalyst solution and olefinic material, and allowing the mixed catalyst solution and cold olefinic material to fall freely through space for a sufficient time and distance to obtain a desired amount of polymerization.

4. A low temperature polymerization process comprising the steps of mixing together a major proportion of isobutylene with a minor proportion of butadiene, cooling the mixture to a temperature within the range between −40° C. and −164° C., delivering a stream of the cold olefinic mixture in a downwardly facing direction, simultaneously delivering a concentric stream of fluid catalyst comprising a solution of a Friedel-Crafts type catalyst in a low-freezing, non-complex-forming solvent, both under a pressure within the range between 10 and 500 lbs. per square inch sufficient to produce a condition of high turbulence in the falling stream for mixing the catalyst and olefinic material, and allowing the mixed fluid catalyst and cold olefinic material to fall freely through space for a sufficient time and distance to obtain a desired amount of polymerization.

5. A low temperature polymerization process comprising the steps of mixing together a major proportion of isobutylene with a minor proportion of dimethyl butadiene, cooling the mixture to a temperature within the range between −40° C. and −164° C., delivering a stream of the cold olefinic mixture in a downwardly facing direction, simultaneously delivering a concentric stream of fluid catalyst comprising a Friedel-Crafts-type catalyst in liquid solution, both under a pressure within the range between 10 and 500 lbs. per square inch sufficient to produce a condition of high turbulence in the falling stream for mixing the catalyst and olefinic material, and allowing the mixed fluid catalyst and cold olefinic material to fall freely through space for a sufficient time and distance to obtain a desired amount of polymerization.

6. A low temperature polymerization process comprising the steps of mixing together a major proportion of isobutylene with a minor proportion of dimethyl butadiene, cooling the mixture to a temperature within the range between −40° C. and −164° C., delivering a stream of the cold olefinic mixture in a downwardly facing direction, simultaneously delivering a concentric stream of fluid catalyst comprising boron trifluoride, both under a pressure within the range between 10 lbs. and 500 lbs. per square inch sufficient to produce a condition of high turbulence in the falling stream for mixing the catalyst and olefinic material, and allowing the mixed fluid catalyst and cold olefinic material to fall freely through space for a sufficient time and distance to obtain a desired amount of polymerization.

7. A low temperature polymerization process comprising the steps of mixing together a major proportion of isobutylene with a minor proportion of dimethyl butadiene, cooling the mixture to a temperature within the range between −40° C. and −164° C., delivering a stream of the cold olefinic mixture in a downwardly facing direction, simultaneously delivering a concentric stream of fluid catalyst comprising boron trifluoride in solution in methyl chloride, both under a pressure within the range between 10 lbs. and 500 lbs. per square inch sufficient to produce a condition of high turbulence in the falling stream for mixing the catalyst and olefinic material, and allowing the mixed fluid catalyst and cold olefinic material to fall freely through space for a sufficient time and distance to obtain a desired amount of polymerization.

8. A low temperature continuous polymerization process comprising the steps of preparing a mixture of isobutylene in major proportion with isoprene in minor proportion at a temperature within the range between −40° C. and −164° C., forming therefrom a free-falling stream of cold mixture under a pressure within the range between 10 and 500 lbs. per square inch, simultaneously preparing a Friedel-Crafts active metal halide catalyst solution, delivering the catalyst solution in a concentric jet within the free-falling stream of cold isobutylene-multiolefin mixture under a substantial pump pressure within the range between 10 and 500 lbs. per square inch sufficient to produce turbulent mixing of the catalyst solution into the isobutylene-multiolefin mixture, thereby causing the polymerization action to begin within the time in which a few inches of free fall occurs under the acceleration of gravity, allowing the stream to fall freely in space for a distance of at least two feet, and collecting the formed polymer and any unpolymerized material at the end of the free fall.

JOHN D. CALFEE.
ROBERT M. THOMAS.
PAUL J. FLORY.

REFERENCES CITED

The following references are of record in the file of this patent:

UNITED STATES PATENTS

| Number | Name | Date |
|---|---|---|
| Re. 22,210 | De Simo | Oct. 27, 1942 |
| 1,386,760 | Bosch | Aug. 9, 1921 |
| 2,121,258 | Osterstrom | June 21, 1938 |
| 2,142,980 | Huijser | Jan. 3, 1939 |
| 2,155,315 | Kremers | Apr. 18, 1939 |
| 2,178,833 | Erasmus | Nov. 7, 1939 |
| 2,238,802 | Altshuler | Apr. 15, 1941 |
| 2,276,893 | Thomas | Mar. 17, 1942 |
| 2,366,460 | Semon | Jan. 2, 1945 |
| 2,374,272 | Carpenter | Apr. 24, 1945 |
| 2,387,026 | Huntington | Oct. 16, 1945 |

FOREIGN PATENTS

| Number | Country | Date |
|---|---|---|
| 505,736 | Great Britain | May 16, 1939 |
| 525,542 | Great Britain | Aug. 30, 1940 |